United States Patent [19]

Yamamoto et al.

[11] Patent Number: 4,910,291

[45] Date of Patent: Mar. 20, 1990

[54] OPTICAL ARTICLE MADE OF AMORPHOUS THERMOPLASTIC POLYESTER RESIN

[75] Inventors: Naoki Yamamoto; Hiroshi Mori, both of Hiroshima; Akira Nakata, Otake, all of Japan

[73] Assignee: Mitsubishi Rayon Company Ltd., Tokyo, Japan

[21] Appl. No.: 228,459

[22] Filed: Aug. 5, 1988

[30] Foreign Application Priority Data

Aug. 6, 1987 [JP] Japan ................................ 62-195260

[51] Int. Cl.$^4$ ............................................ C08G 63/02
[52] U.S. Cl. .................................... 528/272; 528/308; 528/308.6; 528/396; 264/1.1
[58] Field of Search ...................... 528/272, 308, 308.6, 528/396; 264/1.1

[56] References Cited

U.S. PATENT DOCUMENTS

| | | | |
|---|---|---|---|
| 3,291,859 | 12/1966 | Tobolsky | 525/440 |
| 3,351,624 | 11/1967 | Conix | 528/176 |
| 3,423,280 | 1/1969 | Wiener | 428/430 |
| 3,752,802 | 8/1973 | Sheppard | 534/734 |
| 4,025,493 | 5/1977 | Drake | 528/288 |
| 4,279,803 | 7/1981 | Calundann | 524/601 |

FOREIGN PATENT DOCUMENTS 0178836  4/1986  European Pat. Off. .

OTHER PUBLICATIONS 61-149901, vol. 10 No. 351 (P-520) [2407] Nov. 27, 1986 "Material For Optical Instrument", Nakagawa.
57-208645, "Transparent Plastic Board For Information Recording Medium", Fukumoto vol. 7, No. 64 (P-183) [1209], Mar. 17, 1983.
60-34823, "Aromatic Polyester", Nozawa, vol. 9 No. 166 (C-239) [1889] Jul. 11, 1985.

*Primary Examiner*—John Kight, III
*Assistant Examiner*—Sam A. Acquah
*Attorney, Agent, or Firm*—Cushman, Darby & Cushman

[57] ABSTRACT

An optical article such as optical disk and optical lens, made of an amorphous thermoplastic polyester resin comprised of recurring units, each recurring unit having an aromatic ring in the main chain thereof and an aromatic ring in the side chain thereof. The optical article have a good heat resistance, resistance to absorption of moisture and optical characteristics.

9 Claims, No Drawings

OPTICAL ARTICLE MADE OF AMORPHOUS THERMOPLASTIC POLYESTER RESIN

BACKGROUND OF THE INVENTION (1) Field of the Invention

The present invention relates to optical articles made of an amorphous thermoplastic polyester resin. More particularly, the present invention relates to optical articles such as optical disks and optical lenses which are made of an amorphous polyester resin having aromatic rings in the main chain and the side chain of the recurring nits. The optical articles have a good heat resistance, resistance to absorption of moisture and optical characteristics.

(2) Description of the Related Art

Plastics have an excellent processability and productivity as industrial materials, and have a light weight, and these excellent characteristics have increased the demands for the utilization of plastics. Poly(methyl methacrylate) and polycarbonates are mainly used as the plastics for optical materials at present.

Poly(methyl methacrylate) has excellent optical characteristics but an unsatisfactory heat resistance and resistance to absorption of moisture. Accordingly, for example, deformation of an optical disk or a deformation of grooves often occurs during use. In contrast, a polycarbonate has an excellent heat resistance but a poor melt flowability and moldability, and a problem arise of a large birefringence due to molding distortion. A resin for an optical material must have a good heat resistance, an excellent transparency, and a small birefringence, but a resin for an optical material which is capable of satisfying these requirements has not been developed.

SUMMARY OF THE INVENTION

The present inventors carried out research into the development of a high-performance optical material satisfying all of the above requirements, and as a result, found that an amorphous aromatic polyester having a specific structure has an excellent heat resistance, resistance to absorption of moisture, and transparency, and has a small birefringence.

In accordance with the present invention, there is provided an optical article made of an amorphous thermoplastic polyester resin comprised of recurring units, each recurring unit having an aromatic ring in the main chain thereof and an aromatic ring in the side chain thereof.

DESCRIPTION OF THE PREFERRED EMBODIMENTS

According to the present invention, reduction of the birefringence is attempted by introducing aromatic rings into the main chain and side chains of a polyester resin and the polymer is rendered amorphous by disturbing the symmetry of the polymer structure, whereby a high-performance polymer retaining the characteristics of the polyester, such as a good heat resistance and low moisture-absorbing property, can be provided. The optical articles of the present invention include, for example, optical disks, and optical lenses, more particularly, a video disk, a file disk, a rod lens, and an eyeglass lens.

The amorphous thermoplastic polyester resins used for the preparation of optical articles of the present invention can be classified into three types. The first type polyester resin have recurring units derived from a dicarboxylic acid and a diol, one of the dicarboxylic acid and the diol having an aromatic ring in the main chain thereof and the other having an aromatic ring in a pendant group thereof. A typical example of the first type polyester resin is comprised of recurring units represented by the following general formula (I) or (II):

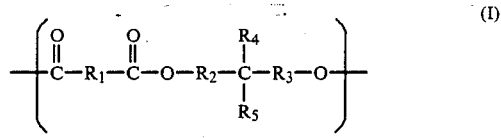

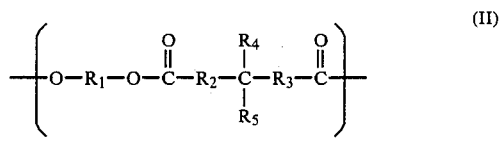

wherein $R_1$ stands for a phenylene group which may have a substituent selected from the group consisting of halogen atoms and an alkyl group having 1 to 5 carbon atoms, $R_2$ and $R_3$ independently stand for an alkylene group having 1 to 5 carbon atoms or a direct bond wherein the sum of the carbon numbers of $R_2$ and $R_3$ is up to 5, $R_4$ stands for a phenyl or benzyl group which may have a substituent selected from the group consisting of halogen atoms and an alkyl group having 1 to 5 carbon atoms, and $R_5$ stands for a hydrogen atom or an alkyl group having 1 to 5 carbon atoms The second type polyester resin is derived from a dicarboxylic acid and a diol, at least one of the dicarboxylic acid and the diol having an aromatic ring in the main chain thereof and an aromatic ring in a pendant group thereof. A typical example of the second type polyester resin is such that the dicarboxylic acid is represented by the following general formula (III) or the diol is represented by the following general formula (IV):

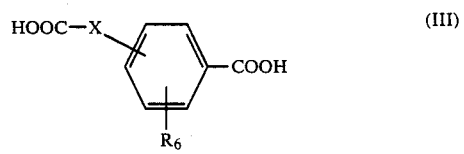

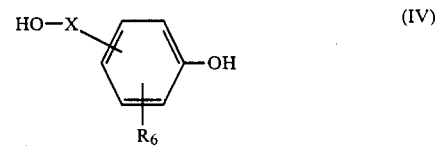

wherein X stands for

or a direct bond, $R_7$ and $R_9$ stand for a hydrogen atom or an alkyl group having 1 to 5 carbon atoms, $R_8$ and $R_{10}$ stand for a phenyl or benzyl group which may have a substituent selected from the group consisting of halogen atoms and an alkyl group having 1 to 5 carbon atoms; and when X is a direct bond $R_6$ stands for a phenyl or benzyl group which may have a substituent selected from the group consisting of halogen atoms and an alkyl group having 1 to 5 carbon atoms; when X is

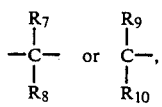

$R_6$ stands for a hydrogen atom or an alkyl group having 1 to 5 carbon atoms. In the second type polyester resin, a diol to be reacted with the dicarboxylic acid of the general formula (III) and a dicarboxylic acid to be reacted with the diol of the general formula (IV) are not particularly critical and may be any structure.

The third type polyester resin is derived from a hydroxycarboxylic acid having an aromatic ring in the main chain thereof and an aromatic ring in a pendant group thereof. A typical example of the third type polyester resin is such that the hydroxycarboxylic acid is represented by the following general formula (V):

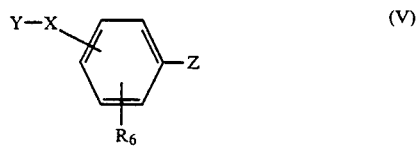

wherein X and $R_6$ are as defined with regard to the formulae (III) and (IV), and one of Y and Z stands for a hydroxyl group and the other stands for a carboxyl group.

The amorphous thermoplastic polyester resin may be of a structure which is a combination of at least two of the above mentioned three types.

It is preferable that the first type polyester resin has at least 50% by mole of the recurring units of the formula (I) or (II); the second type polyester resin is such that at least 50% by mole of the dicarboxylic acid used for the preparation of the polyester resin is represented by the formula (II) or at least 50% by mole of the diol used for the preparation of the polyester resin is represented by the formula (IV); and the third type polyester resin is such that at least 50% by mole of the hydroxycarboxlic acid used for the preparation of the polyester resin is represented by the formula (V).

Thus, the processed for the preparation of the amorphous thermoplastic polyester resin can be classified into the following five processes.

(1) A process in which a dicarboxylic acid having an aromatic ring in the main chain and a diol having an aromatic ring in a pendant group are used.

(2) A process in which a diol having an aromatic ring i the main chain and a dicarboxylic acid having an aromatic ring in a pendant group are used.

(3) A process in which a dicarboxylic acid having an aromatic ring in the main chain and an aromatic ring in a pendant group and a diol are used.

(4) A process in which a diol having an aromatic ring in the main chain and an aromatic ring in a pendant group and a dicarboxylic acid are used.

(5) A process in which a hydroxycarboxylic acid having an aromatic ring in the main chain and an aromatic ring in a pendant group is used.

These processes can be employed alone, or two or more thereof can be employed in combination.

As the dicarboxylic acid having an aromatic ring in the main chain, there can be mentioned terephthalic acid, isophthalic acid, phthalic acid, diphenyl-p,p'-dicarboxylic acid, diphenyl-m,m'-dicarboxylic acid, benzophenone-4,4''-dicarboxylic acid, and p-phenylenediacetic acid.

As the diol having an aromatic ring in the side chain, there can be mentioned phenylethyleneglycol, 2-phenyl-1,3-propanediol, 2-methyl-2-phenyl-1,3-propanediol, 2-ethyl-2-phenyl-1,3-propanediol, 2-methyl-2-phenyl-1,4-butanediol, 2-benzyl-1,3-propanediol, 2-methyl-2-benzyl-1,3-propanediol and 2-ethyl-2-benzyl-1,3-propanediol. To obtain an amorphous polymer having a high heat resistance, the diol of this type must have an asymmetric substituent and the carbon number of the aliphatic hydrocarbon constituting the main chain must be up to 5.

As the diol having an aromatic ring in the main chain, there can be mentioned hydroquinone, resorcinol, 2,2-bis-(4-hydroxyphenyl)propane, 2,2-bis-(4-hydroxy-3,5-dichlorophenyl)-propane, 4,4'-dihydroxybiphenol, 4,4'-dihydroxybiphenylsulfone, 4,4'-dihydroxybiphenyl ether, 4,4'-dihydroxydiphenyl sulfide, 4,4'-dihydroxyphenyl ketone, and 4,4'-dihydroxybiphenylmethane.

As the dicarboxylic acid having an aromatic ring in a pendant group or the side chain, there can be mentioned phenylmalonic acid, methylphenylmalonic acid, ethylphenylmalonic acid, phenylsuccinic acid, 2-methyl-2-phenylsuccinic acid, 2-methyl-3-phenylsuccinic acid, benzylmalonic acid and benzylsuccinic acid. To obtain an amorphous polymer having a high heat resistance, the dicarboxylic acid of this type must have an asymmetric substituent and the carbon number of the aliphatic hydrocarbon constituting the main chain must be up to 5.

As the dicarboxylic acid having an aromatic ring in the main chain and an aromatic ring in a pendant group or the side chain, there can be mentioned phenylterephthalic acid, phenylisophthalic acid, p-(carboxybenzyl)-benzoic acid, p-(pheylcarboxyethyl)benzoic acid, 1-phenyl-2,2-bis-(4-carboxyphenyl)propane and 1-phenyl-3,3-bis-(4-carboxyphenyl)butane.

As the diol having an aromatic ring in the main chain and an aromatic ring in a pendant group or the side chain, there can be mentioned phenylhydroquinone, (4,4'-dihydroxy)triphenylmethane, (p-hydroxyphenyl) phenyl methanol, 2-(p-hydroxyphenyl)-1-phenyl ethanol, 1-phenyl-2,2-bis(4-hydroxyphenyl)propane and 1-phenyl-3,3-bis(4hydroxyphenyl)butane.

As the hydroxycarboxylic acid having an aromatic ring in the main chain and an aromatic ring in a pendant group or the side chain, there can be mentioned phenylhydroxybenzoic acid, (p-carboxyphenyl)phenyl methanol, (p-hydroxyphenyl)phenyl acetic acid, 1-phenyl-2-(4'-hydroxyphenyl)-2-(4'-carboxyphenyl)butane and 1-phenyl-3-(4-hydroxy-phenyl)-3-(4'-carboxylphenyl) butane.

The process of the polycondensation for the production of the amorphous thermoplastic polyester resin is not particularly critical, and a usual process such as the heat-melting polycondensation process and the solution polymerization process can be adopted. A salt of a metal such as antimony, manganese, tin or titanium or a tertiary amine can be used as a catalyst for the polycondensation. Moreover a small amount of other dicarboxylic acid or diol may be copolymerized.

The amorphous thermoplastic polyester resin can be processed into a predetermined optical material according to customary procedures. Namely, the aromatic polyester is molded into a predetermined shape and size by injection molding, or compression molding according to the intended product such as an optical disk, or an optical lens, and the molded resin is subjected to predetermined processing and post treatment, whereby an intended optical article can be obtained.

The amorphous thermoplastic polyester resin used in the present invention may contain various stabilizers, for example, a light stabilizer such as an ultraviolet absorbent and a heat stabilizer such as an antioxidant.

An optical article of the present invention, which is composed of the specified aromatic polyester has an excellent heat resistance, resistance to absorption of moisture, and optical characteristics, and moreover, the balance of these properties in this thermoplastic resin is excellent compared to optical materials of conventional plastics.

The invention will now be illustrated by the following examples, wherein the light transmittance, water absorption, and birefringence were measured according to the following methods.

Light transmittance:

The light transmittance was measured by an integrating-sphere photometer, using a test piece having a thickness of 3 mm, according to JIS K-6714.

Water absorption:

The absorption of water at 23° C. for 24 hours was measured, using a test piece having a thickness of 3 mm and a diameter of 50 mm, according to JIS K-6911.

Birefringence:

A disk having a thickness of 1.2 mm and a diameter of 130 mm was formed by injection molding, and the retardation value of the disk was measured at room temperature (20° C.) by a Senarmont compensator equipped with a polarization microscope and a sodium lamp as the light source.

EXAMPLE 1

A three-neck flask equipped with a stirrer was charged with 50 parts by weight of dimethyl phthalate, 50 parts by weight of 2-methyl-2-phenyl-1,3-propanediol, and 0.01 part by weight of tetrabutoxy titanium, and the temperature was elevated from 200° to 280° C. over a period of 2 hours under atmospheric pressure in a nitrogen atmosphere with stirring, and the methanol formed was removed by distillation. Then, the temperature was elevated to 300° C. over a period of 1 hour, and during this period, the pressure was gradually reduced to produce conditions of 300° C. and 0.2 mmHg. Under these conditions, reaction was conducted for 1 hour to obtain a polymer. The obtained polymer was extruded and pelletized according to customary procedures, and a test piece for evaluation was formed by injection molding. The light transmittance, water absorption, and retardation of this test piece were measured, and the results are shown in the Table 1 below. Note, the 7 sp/c value of the polymer as measured in chloroform at a concentration of 0.5 g/dl was 0.65.

EXAMPLE 2 THROUGH 6

Polymers were prepared by using compounds shown in the Table 1 in a manner similar to that described in Example 1, and the obtained polymers were molded and evaluated in the same manner as described in Example 1. The results are shown in the Table 1 below. Note, all of "parts" in the table are by weight, and the 7 sp/c values of the obtained polymers were in the range of from 0.63 to 0.69. Accordingly, it was proved that the polymers had a good heat resistance.

TABLE 1

| | Composition of Charge | Light transmittance (%) | Retardation (nm) | Water absorption (%) |
|---|---|---|---|---|
| Example 1 | 50 parts of dimethyl terephthalate, 50 parts of 2-methyl-2-phenyl-1,3-propanediol and 0.01 part of tetrabutoxy titanium | 86 | 25 | 0.2 |
| Example 2 | 45 parts of dimethyl terephthalate, 5 parts of dimethyl isophthalate, 50 parts of 2-methyl-2-phenyl-1,3-propanediol and 0.01 part of tetrabutoxy titanium | 86 | 25 | 0.2 |
| Example 3 | 47 parts of dimethyl terephthalate, 53 parts of 2-ethyl-2-phenyl-1,3-popanediol and 0.01 part of tetrabutoxy titanium | 86 | 25 | 0.2 |
| Example 4 | 65 parts of diphenyl terephthalate, 35 parts of 2-phenyl-1,2-propanediol and 0.01 part of tetrabutoxy titanium | 86 | 30 | 0.2 |
| Example 5 | 45 parts of dimethyl terephthalate, 55 parts of 3-methyl-3-phenyl-1,5-pentanediol and 0.01 part of tetrabutoxy titanium | 86 | 30 | 0.2 |
| Example 6 | 47 parts of dimethyl terephthalate, 53 parts of 2-methyl-2-benzyl-1,3-propanediol and 0.01 part of tetrabutoxy titanium | 86 | 20 | 0.2 |

COMPARATIVE EXAMPLES 1 THROUGH 3

For comparison, commercially available poly(methyl methacrylate), polycarbonate, and polystyrene were molded and evaluated in the same manner as described in Example 1. The results are shown in Table 2 below.

TABLE 2

| | Plastics | Light transmittance (%) | Retardation (nm) | Water absorption (%) |
|---|---|---|---|---|
| Comparative Example 1 | polystyrene | 88 | 80 | 0.01 |
| Comparative Example 2 | polycarbonate | 88 | 150 | 0.2 |
| Comparative Example 3 | poly(methyl methacrylate) | 93 | 15 | 0.4 |

EXAMPLE 7

A three-neck flask equipped wit a stirrer was charged with 69 parts by weight of benzylsuccinyl dichloride, 31 parts by weight of hydroquinone, 500 parts by weight of chloroform and 30 parts by weight of pyridine, and the polycondensation was carried out at 10° C. for 6 hours in a nitrogen atmosphere with stirring. The polymerization mixture was put into a salient amount of methanol to precipitate a polymer. The polymer was recovered, dried and then extruded and pelletized. A test piece was made and evaluated in the same manner as described in Example 1. The light transmittance was 86%, the water absorption was 0.2% and the retardation was 22 nm.

EXAMPLE 8

Using a charge composed of 78 parts by weight of 1-phenyl-3,3-bis(4-chloroformylphenyl)butane, 11 parts by weight of hydroquinone, 11 parts by weight of resorcinol, 500 parts by weight of chloroform and 30 parts by weight of pyridine, the polycondensation was carried out and the polymer was evaluated in the same manner as that described in Example 7. The light transmittance was 88%, the water absorption was 0.15% and the retardation was 25 nm.

EXAMPLE 9

Using a charge composed of 20 parts by weight of terephthaloyl dichloride, 20 parts by weight of isophthaloyl dichloride, 60 parts by weight of 1-phenyl-3,3-bis-(4-hydroxyphenyl)butane, 500 parts by weight of chloroform and 30 parts by weight of pyridine, the polycondensation was carried out and the polymer was evaluated in the same manner as that described in Example 7. The light transmittance was 88%, the water absorption was 0.15% and the retardation was 25 nm.

EXAMPLE 10

A three-neck flask equipped with a stirrer was charged with 100 parts by weight of 1-phenyl-3-(4-acetoxyphenyl)-3-(4'-carboxyphenyl)butane and 0.01 part by weight of tetrabutoxy titanium, and the temperature was elevated from 200° to 300° C. over a period of 2 hours under atmospheric pressure in a nitrogen atmosphere with stirring, and the acetic acid formed was removed by distillation. Then, the temperature was elevated to 320° C. over a period of 1 hour, and during this period, the pressure was gradually reduced to produce conditions of 320° C. and 0.1 mmHg. Under these conditions, the polycondensation was conducted further for 1 hour to obtain a polymer. The obtained polymer was extruded and pelletized, and a test piece as formed and evaluated in the same manner as that described in Example 1. The light transmittance was 86%, the water absorption was 0.15% and the retardation was 20 nm.

We claim:

1. An optical article made of an amorphous thermoplastic polyester resin comprised of recurring units represented by the following general formula (I) or (II):

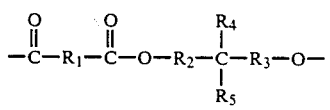

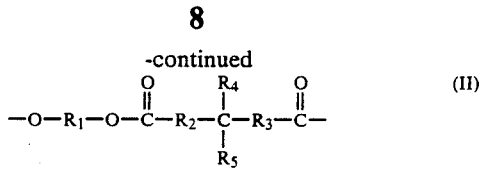

wherein $R_1$ stands for a phenylene group which may have a substituent selected from the group consisting of halogen atoms and an alkyl group having 1 to 5 carbon atoms, $R_2$ and $R_3$ independently stand for an alkylene group having 1 to 5 carbon atoms or a direct bond wherein the sum of the carbon numbers of $R_2$ and $R_3$ is up to 5, $R_4$ stands for a benzyl group which may have a substituent selected from the group consisting of halogen atoms and an alkyl group having 1 to 5 carbon atoms, and $R_5$ stands for a hydrogen atom or an alkyl group having 1 to 5 carbon atoms.

2. An optical article according to claim 1, which is an optical disk.

3. An optical article according to claim 1, which is an optical lens.

4. An optical article made of an amorphous thermoplastic polyester resin comprised of recurring units derived from a dicarboxylic acid and a diol, at least one of the dicarboxylic acid and the diol having an aromatic ring in the main chain thereof and an aromatic ring in a pendant group thereof;

wherein said dicarboxylic acid having an aromatic ring in the main chain thereof and an aromatic ring in a pendant group is represented by the following general formula (III) and said diol having an aromatic ring in the main chain thereof and an aromatic ring in a pendant group is represented by the following general formula (IV):

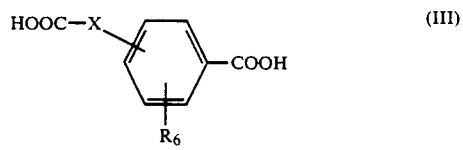

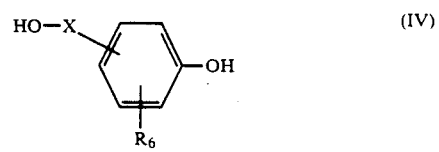

wherein X stands for

or a direct bond, $R_7$ and $R_9$ stand for hydrogen atom or an alkyl group having 1 to 5 carbon atoms, $R_8$ and $R_{10}$ stand for phenyl or benzyl group which may have a substituent selected from the group consisting of halogen atoms and an alkyl group having 1 to 5 carbon atoms; and when x is a direct bond, $R_6$ stands for a phenyl or benzyl group which may have a substituent selected from the group consisting of halogen atoms and an alkyl group having 1 to 5 carbon atoms; when X is

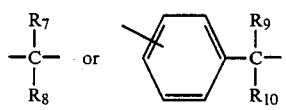

$R_6$ stands for a hydrogen atom or a alkyl group having 1 to 5 carbon atoms.

5. An optical article according to claim 4, which is an optical disk.

6. An optical article according to claim 4, which is an optical lens.

7. An optical article made of an amorphous thermoplastic polyester resin comprised of recurring units derived from a hydroxycarboxylic acid represented by the following general formula (V):

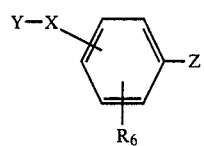

wherein X and $R_6$ are as defined in claim 4, and one of Y and Z stands for a hydroxy group and the other stands for a carboxyl group.

8. An optical article according t claim 7, which is an optical disk.

9. An optical article according to claim 7, which is an optical lens.

* * * * *